United States Patent [19]

Kamata

[11] Patent Number: 4,624,156
[45] Date of Patent: Nov. 25, 1986

[54] CRANKSHAFT ASSEMBLY

[75] Inventor: Yoshikiyo Kamata, Hachioji, Japan

[73] Assignee: Kioritz Corporation, Tokyo, Japan

[21] Appl. No.: 741,825

[22] Filed: Jun. 6, 1985

[30] Foreign Application Priority Data

Jun. 20, 1984 [JP]  Japan ............... 59-92039[U]

[51] Int. Cl.⁴ .................................. F16C 3/04
[52] U.S. Cl. ...................... 74/595; 29/464; 74/598; 74/603
[58] Field of Search .......... 74/595, 598, 597, 603, 74/604; 29/464, 465, 468, 6, 156.4 R

[56] References Cited

U.S. PATENT DOCUMENTS 2,364,109  12/1944  Taylor .......................... 29/6

Primary Examiner—Larry I. Schwartz
Attorney, Agent, or Firm—Browdy and Neimark

[57] ABSTRACT

A crankshaft assembly including a pair of crankshafts and an intermediate crank arm, wherein a through opening is formed in a crank web of each of the crankshafts to extend axially of the respective crankshaft. In assembling the part, one crankpin of the intermediate crank arm is force fitted in an opening formed in a crank arm of the one crankshaft and a jig having a columnar portion is inserted in the through opening formed in the one crankshaft to support the one crankpin, thereby providing a crankshaft sub-assembly. When another crankpin of the intermediate crank arm is force fitted in an opening formed in a crank arm of the other crankshaft, the pressure applied to the crankpin is borne by the jig, so that the other crankshaft can be accurately secured to the intermediate crank arm.

4 Claims, 5 Drawing Figures

CRANKSHAFT ASSEMBLY

BACKGROUND OF THE INVENTION

This invention relates to a crankshaft assembly composed of a pair of crankshafts each having a crank arm formed with an opening for a crankpin to be force fitted and secured therein and a crank web disposed in a position diametrically opposed to that of the crank arm and an intermediate crank arm formed at opposite end portions thereof with the crankpins each force fitted and secured in one of the openings at the crank arms, and more particularly it is concerned with a crankshaft assembly of the type described which is suitable for use with a two-cylinder, two-cycle internal combustion engine wherein fuel-air mixture is supplied from a carburetor to a crankcase and pressure is applied thereto.

In a crankshaft assembly of the type described of the prior art, the assembling of the parts is performed as follows. A crankpin formed at one end of the intermediate crank arm is force fitted and secured in an opening formed in the crank arm of one crankshaft to provide a sub-assembly, and a crankpin formed at an opposite end of the intermediate crank arm of the sub-assembly is force fitted and secured in an opening formed in the crank arm of the other crankshaft, to provide a complete assembly.

In producing the crankshaft assembly of the aforesaid type, it has hitherto been usual practice to insert, when the operation of assembling the parts is performed, a plate-like jig in a clearance between the crank web of the crankshaft and the intermediate crank arm of the sub-assembly so that the jig will bear pressure which is applied to the other crankpin to force fit same in the opening formed in the crank arm of the other crankshaft, to thereby prevent excessive pressure from being applied to the crankshaft of the sub-assembly. In the internal combustion engine of the type described hereinabove, it is necessary to minimize the dead space in the crankcase to improve engine efficiency by increasing the primary compression pressure of the fuel-air mixture. To this end, the clearance between the crankshaft and the intermediate crank arm is made as small as possible. This makes it imperative to use a jig of a small thickness for insertion in the clearance of a small size. Thus, the crankshaft assembly of the type described of the prior art has had the problem that the jig itself might undergo deformation when a crankpin force fitting operation is performed, resulting in the crankshaft and intermediate crank arm being out of alignment with each other and adversely affecting the crankshaft sub-assembly.

SUMMARY OF THE INVENTION

This invention has as its object the provision of a crankshaft assembly capable of accurately securing a crankshaft to the intermediate crank arm of a crankshaft sub-assembly by obviating the aforesaid problem of the prior art.

The aforesaid object can be accomplished according to the invention by forming an axial opening in the crank web of each crankshaft of the crankshaft assembly and inserting a columnar jig in the axial opening to support the crankpin of the intermediate crank arm, so that pressure applied to the crankpin of the intermediate arm to be force fitted in the opening formed in the crank arm of the other crankshaft can be borne by the jig and the other crankshaft can be accurately secured to the intermediate crank arm.

The crankshaft assembly provided by the invention is high in precision and free from tilting and torsion, and the jigs used in assembling the parts are easy to fabricate in high precision.

DESCRIPTION OF THE PREFERRED EMBODIMENT

Figure 1:
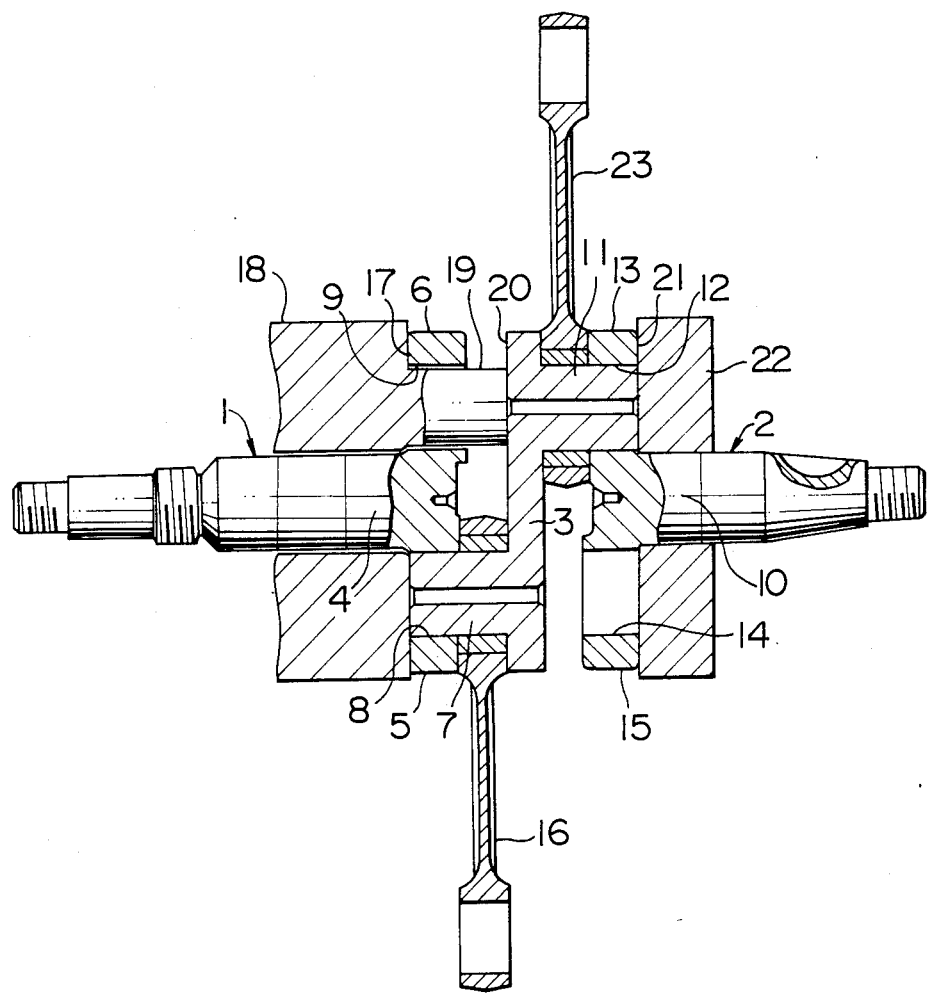
FIG. 1 is vertical sectional view of the crankshaft assembly supported by the jig comprising one embodiment of the invention.

FIG. 1 shows the crankshaft assembly supported by the jig according to the invention comprising a pair of crankshafts 1 and 2, and an intermediate crank arm 3. The crankshaft assembly is suitable for use with a two-cylinder, two-cycle internal combustion engine of the opposed cylinder type.

Figure 2A:
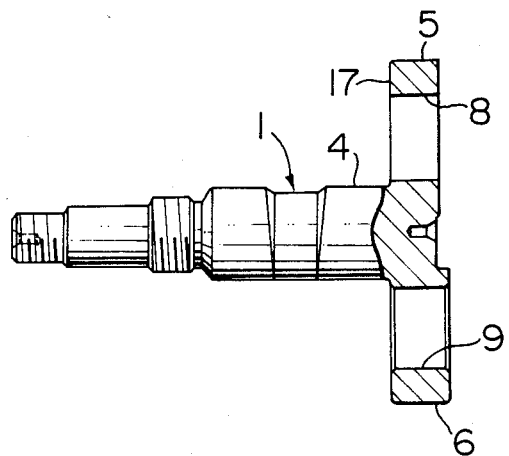
FIG. 2A is a vertical sectional view of one crankshaft of the crankshaft assembly shown in FIG. 1.
Figure 2B:
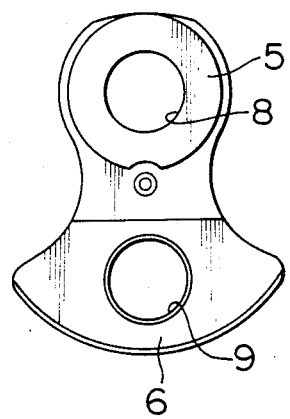
FIG. 2B is an end view of the crankshaft shown in FIG. 2A.

The crankshaft 1 includes a crank journal 4 at which the crankshaft 1 is supported for rotation by a main body of the engine. As shown in FIGS. 2A and 2B, the crankshaft 1 further includes a crank arm 5, and a crank web 6 formed integrally with the crank arm 5 and disposed in a position diametrically opposed to that of the crank arm 5. The crank arm 5 is formed with an opening 8 for a forward end portion of a crank pin 7 formed at one end of the intermediate crank arm 3 to be force fitted and secured therein. The crank web 6 is formed with a through opening 9 extending axially of the crankshaft 1 to allow a columnar portion of a jig to extend therethrough as subsequently to be described.

Figure 3A:
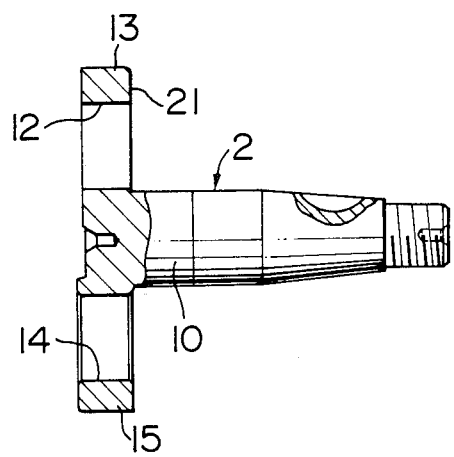
FIG. 3A is a vertical sectional view of the other crankshaft of the crankshaft assembly shown in FIG. 1.
Figure 3B:
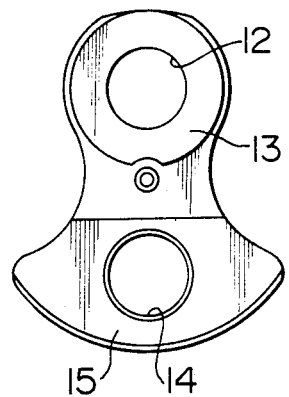
FIG. 3B is an end view of the crankshaft shown in FIG. 3A.

Like the crankshaft 1, the other crankshaft 2 includes a journal 10, a crank arm 13 formed with an opening 12 for receiving a crankpin 11 formed at an opposite end of the intermediate crank arm 3, and a crank web 15 formed with a through opening 14 extending axially of the crankshaft 2 (see FIGS. 3A and 3B).

In assembling the parts of the crankshaft assembly of the aforesaid construction, a connecting rod 16 is rotatably connected to the crankpin 7 of the intermediate crank arm 3, and the forward end portion of the crankpin 7 is force fitted and secured in the opening 8 formed in the crankshaft 1, to provide a crankshaft sub-assembly. Then, a jig 18 is positioned against a surface portion 17 of the crankshaft 1 of the crankshaft sub-assembly, and a columnar portion 19 of the jig 18 is inserted in the axial opening 9 formed in the crankshaft 1 in such a manner that a forward end of the columnar portion 19 abuts against a surface portion 20 of the crankpin 11 of the intermediate crank arm 3. Then, another jig 22 is positioned against a surface portion 21 of the crankshaft 2, and another connecting rod 23 is connected to the crankpin 11 of the intermediate crank arm 3 for rotation. A forward end portion of the crankpin 11 is force fitted and secured in the opening 12 formed in the crankshaft 2. At this time, the intermediate crank arm 3 is positively supported at the forward end of the crankpin 7 by the jig 18 and at the surface portion 20 by the columnar portion 19 of the jig 18 as pressure is applied to the crankpin 11 to force fit same in the opening 12. This makes it possible to secure the crankshaft 2 to the intermediate crank arm 3 accurately without the two parts being brought out of alignment with each other.

The axial openings 9 and 14 may be closed by filling same with a suitable material, to adjust the balance of the crankshaft assembly or the volume of the crankcase, after the crankshaft assembly is produced.

What is claimed is:

1. A crankshaft assembly and jig means for assembling said crankshaft assembly comprising:
    a pair of crankshafts each including a crank arm, each crank arm extending in a direction normal to its respective crankshaft and formed with an opening for a crank pin to be force fitted and secured therein, and a crank web coextensive with each said crank arm and disposed diametrically opposite to its respective crank arm; and
    an intermediate crank arm having opposing end portions and a crank pin at each end portion, each said crank pin being adapted to be force fitted and secured in a respective one of the openings formed in the crank arms of said pair of crankshafts;
    wherein the improvement comprises;
    each crank web of said pair of crankshafts having a through opening for receiving a columnar portion of said jig extending axially of the respective crankshafts for force fitting each said crank pin into a respective crank arm.

2. A crankshaft assembly for use in an engine, comprising:
    a first crankshaft including a rearwardly directed journal having a first axis of rotation, a first crank arm extending laterally of said axis in a first direction, and a first crank web coextensive with said first crank arm and extending in a second direction opposite said first direction,
    a second crankshaft including a forwardly-directed journal having a second axis of rotation substantially coextensive with said first axis of rotation, a second crank arm extending laterally of said second axis of rotation in said second direction, and a second crank web coextensive with said second crank arm and extending in said first direction, and
    means for interconnecting said first crankshaft crank arm with said second crankshaft crank arm such that said first crankshaft crank web is disposed opposite said second crankshaft crank arm and said first crankshaft crank arm is disposed opposite said second crankshaft crank web.

3. A crankshaft assembly for use in an engine, comprising:
    a first crankshaft including a rearwardly directed journal having a first axis of rotation, a first crank arm extending laterally of said axis in a first direction, and a first crank web coextensive with said first crank arm and extending in a second direction opposite said first direction, said first crank arm and said first crank web each including openings extending therethrough,
    a second crankshaft including a forwardly-directed journal having a second axis of rotation substantially coextensive with said first axis of rotation, a second crank arm extending laterally of said second axis of rotation in said second direction, and a second crank web coextensive with said second crank arm and extending in said first direction, said second crank arm and said second crank web each including openings extending therethrough, and
    means for interconnecting said first crankshaft crank arm with said second crankshaft crank arm such that said first crankshaft crank web is disposed opposite said second crankshaft crank arm and said first crankshaft crank arm is disposed opposite said second crankshaft crank web, said interconnecting means comprising a first crank pin extending toward said first crankshaft and being of such an exterior dimension as to be force-fitted in said opening of said first crankshaft crank arm, and a second crank pin extending toward said second crankshaft and being of such exterior dimension as to be force-fitted in said opening of said second crankshaft crank arm.

4. A method of assemblying a crankshaft assembly comprising:
    a first crankshaft including a rearwardly directed journal having a first axis of rotation, a first crank arm extending laterally of said axis in a first direction, and a first crank web coextensive with said first crank arm and extending in a second direction opposite said first direction, said first crank arm and said first crank web each including openings extending therethrough,
    a second crankshaft including a forwardly-directed journal having a second axis of rotation substantially coextensive with said first axis of rotation, a second crank arm extending laterally of said second axis of rotation in said second direction, and a second crank web coextensive with said second crank arm and extending in said first direction, said second crank arm and said second crank web each including openings extending therethrough, and
    means for interconnecting said first crankshaft crank arm with said second crankshaft crank arm such that said first crankshaft crank web is disposed opposite said second crankshaft crank arm and said first crankshaft crank arm is disposed opposite said second crankshaft crank web, said interconnecting means comprising a first crank pin extending toward said first crankshaft and being of such an exterior dimension as to be force-fitted in said opening of said first crankshaft crank arm, and a second crank pin extending toward said second crankshaft and being of such exterior dimension as to be force-fitted in said opening of said second crankshaft crank arm;
    said method comprising the steps of:
    pressing said first crank pin into force-fit engagement within said opening of said first crankshaft crank arm,
    providing support means for preventing rearward movement of the rearwardly directed end faces of said first crankshaft crank web, said first crankshaft crank arm, said first crank pin and second crank pin, and
    pressing said second crankshaft toward said first crankshaft so that said second crankshaft crank arm opening makes a secure, force-fit engagement with said second crank pin.

* * * * *